US008620937B2

(12) United States Patent
Jonas

(10) Patent No.: US 8,620,937 B2
(45) Date of Patent: Dec. 31, 2013

(54) REAL TIME DATA WAREHOUSING

(75) Inventor: Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 2388 days.

(21) Appl. No.: 11/332,423

(22) Filed: Jan. 13, 2006

(65) Prior Publication Data

US 2007/0038664 A1 Feb. 15, 2007

Related U.S. Application Data

(62) Division of application No. 10/331,068, filed on Dec. 27, 2002, now Pat. No. 8,452,787.

(51) Int. Cl.
*G06F 17/30* (2006.01)

(52) U.S. Cl.
USPC .......................................... 707/758

(58) Field of Classification Search
USPC ............................ 707/3, 758, 737
See application file for complete search history.

(56) References Cited

U.S. PATENT DOCUMENTS

| | | | |
|---|---|---|---|
| 1,261,167 A | 4/1918 | Russell |
| 3,659,085 A | 4/1972 | Potter et al. |
| 4,232,313 A | 11/1980 | Fleishman |
| 4,981,370 A | 1/1991 | Dziewit et al. |
| 5,010,478 A | 4/1991 | Deran |
| 5,229,764 A | 7/1993 | Matchett et al. |
| 5,403,639 A | 4/1995 | Belsan et al. |
| 5,454,101 A | 9/1995 | Mackay et al. |
| 5,534,855 A | 7/1996 | Shockley et al. |
| 5,555,409 A | 9/1996 | Leenstra et al. |
| 5,560,006 A | 9/1996 | Layden et al. |
| 5,608,907 A | 3/1997 | Fehskens et al. |

(Continued)

FOREIGN PATENT DOCUMENTS

| | | |
|---|---|---|
| JP | 63282838 | 11/1988 |
| JP | 2012563 | 1/1990 |

(Continued)

OTHER PUBLICATIONS

Tu, Pattern Recognition and Geographical Data Standardization, The Proceedings of Geoinformatics '99 Conference, Jun. 19-21, 1999, pp. 1-7.

(Continued)

*Primary Examiner* — Sheree Brown
(74) *Attorney, Agent, or Firm* — Gates & Cooper LLP

(57) ABSTRACT

A method and system for processing data into and in a database and for retrieving the processed data is disclosed. The data comprises identifiers of a plurality of entities. The method and system comprises: (a) processing data into and in a database, (b) enhancing received data prior to storage in a database, (c) determining and matching records based upon relationships between the records in the received data and existing data without any loss of data, (d) enabling alerts based upon user-defined alert rules and relationships, (e) automatically stopping additional matches and separating previously matched records when identifiers used to match records are later determined to be common across entities and not generally distinctive of an entity, (f) receiving data queries for retrieving the processed data stored in the database, (g) utilizing the same algorithm to process the queries and (h) transferring the processed data to another database that uses the same algorithm.

36 Claims, 7 Drawing Sheets

(56) References Cited

U.S. PATENT DOCUMENTS

| | | |
|---|---|---|
| 5,659,731 A | 8/1997 | Gustafson |
| 5,675,785 A | 10/1997 | Hall et al. |
| 5,758,343 A | 5/1998 | Vigil et al. |
| 5,764,977 A | 6/1998 | Oulid-Aissa et al. |
| 5,778,375 A | 7/1998 | Hecht |
| 5,781,911 A | 7/1998 | Young et al. |
| 5,784,464 A | 7/1998 | Akiyama et al. |
| 5,794,246 A | 8/1998 | Sankaran et al. |
| 5,799,309 A | 8/1998 | Srinivasan |
| 5,819,263 A | 10/1998 | Bromley et al. |
| 5,848,373 A | 12/1998 | DeLorme et al. |
| 5,878,416 A | 3/1999 | Harris et al. |
| 5,892,828 A | 4/1999 | Perlman |
| 5,933,831 A | 8/1999 | Jorgensen |
| 5,991,408 A | 11/1999 | Pearson et al. |
| 5,991,733 A | 11/1999 | Aleia et al. |
| 5,991,758 A | 11/1999 | Ellard |
| 5,991,765 A | 11/1999 | Vethe |
| 5,995,097 A | 11/1999 | Tokumine et al. |
| 5,995,973 A | 11/1999 | Daudenarde |
| 6,014,670 A | 1/2000 | Zamanian et al. |
| 6,032,158 A | 2/2000 | Mukhopadhyay et al. |
| 6,035,295 A | 3/2000 | Klein |
| 6,035,300 A | 3/2000 | Cason et al. |
| 6,035,306 A | 3/2000 | Lowenthal et al. |
| 6,041,410 A | 3/2000 | Hsu et al. |
| 6,044,378 A | 3/2000 | Gladney |
| 6,049,805 A | 4/2000 | Drucker et al. |
| 6,052,693 A | 4/2000 | Smith et al. |
| 6,058,477 A | 5/2000 | Kusakabe et al. |
| 6,065,001 A | 5/2000 | Ohkubo et al. |
| 6,073,140 A | 6/2000 | Morgan et al. |
| 6,076,167 A | 6/2000 | Borza |
| 6,092,199 A | 7/2000 | Dutcher et al. |
| 6,122,641 A | 9/2000 | Williamson et al. |
| 6,122,757 A | 9/2000 | Kelley |
| 6,160,903 A | 12/2000 | Hamid et al. |
| 6,167,517 A | 12/2000 | Gilchrist et al. |
| 6,185,557 B1 | 2/2001 | Liu |
| 6,202,151 B1 | 3/2001 | Musgrave et al. |
| 6,208,990 B1 | 3/2001 | Suresh et al. |
| 6,263,446 B1 | 7/2001 | Kausik et al. |
| 6,272,495 B1 | 8/2001 | Hetherington |
| 6,289,334 B1 | 9/2001 | Reiner et al. |
| 6,317,834 B1 | 11/2001 | Gennaro et al. |
| 6,334,132 B1 | 12/2001 | Weeks |
| 6,339,775 B1 | 1/2002 | Zamanian et al. |
| 6,357,004 B1 | 3/2002 | Davis |
| 6,385,604 B1 | 5/2002 | Bakalash et al. |
| 6,418,450 B2 | 7/2002 | Daudenarde |
| 6,446,210 B1 | 9/2002 | Borza |
| 6,460,037 B1 | 10/2002 | Weiss et al. |
| 6,523,041 B1 | 2/2003 | Morgan et al. |
| 6,684,334 B1 | 1/2004 | Abraham |
| 6,697,947 B1 | 2/2004 | Matyas, Jr. et al. |
| 6,734,783 B1 | 5/2004 | Anbai |
| 6,743,022 B1 | 6/2004 | Sarel |
| 6,757,689 B2 | 6/2004 | Battas et al. |
| 6,819,797 B1 | 11/2004 | Smith |
| 6,886,747 B2 | 5/2005 | Snapp |
| 6,912,549 B2* | 6/2005 | Rotter et al. .................. 707/200 |
| 6,931,392 B1 | 8/2005 | Skeen |
| 6,954,757 B2 | 10/2005 | Zargham et al. |
| 6,968,338 B1 | 11/2005 | Gawdiak et al. |
| 7,003,560 B1 | 2/2006 | Mullen et al. |
| 7,092,951 B1 | 8/2006 | Luo et al. |
| 7,240,027 B2 | 7/2007 | McConnell et al. |
| 2001/0049690 A1 | 12/2001 | McConnell et al. |
| 2002/0023088 A1 | 2/2002 | Thwaites |
| 2002/0038308 A1 | 3/2002 | Cappi |
| 2002/0107864 A1 | 8/2002 | Battas et al. |
| 2002/0107957 A1 | 8/2002 | Zargham et al. |
| 2002/0165903 A1 | 11/2002 | Zargham et al. |
| 2002/0184509 A1 | 12/2002 | Scheidt et al. |
| 2003/0030733 A1 | 2/2003 | Seaman et al. |
| 2003/0097380 A1 | 5/2003 | Mulhern et al. |
| 2003/0182018 A1 | 9/2003 | Snapp |
| 2003/0182568 A1 | 9/2003 | Snapp et al. |
| 2003/0191739 A1 | 10/2003 | Chatterjee et al. |
| 2004/0007616 A1 | 1/2004 | Snapp |
| 2004/0049682 A1 | 3/2004 | Wilson et al. |
| 2004/0128274 A1 | 7/2004 | Snapp et al. |
| 2004/0162802 A1 | 8/2004 | Jonas |
| 2004/0210763 A1 | 10/2004 | Jonas |
| 2005/0060556 A1 | 3/2005 | Jonas |
| 2005/0066182 A1 | 3/2005 | Jonas |
| 2006/0010119 A1 | 1/2006 | Jonas |

FOREIGN PATENT DOCUMENTS

| | | |
|---|---|---|
| JP | 03-017792 | 1/1991 |
| JP | 04-237373 | 8/1992 |
| JP | 05-127959 | 5/1993 |
| JP | 05-250416 | 9/1993 |
| JP | 10275158 | 10/1998 |
| JP | 11184884 | 7/1999 |
| JP | 11296532 | 10/1999 |
| JP | 2000339351 | 12/2000 |
| JP | 2001117940 | 4/2001 |
| JP | 2001325425 | 11/2001 |
| WO | 98/48360 | 10/1998 |
| WO | 98/55947 | 12/1998 |
| WO | 99/64970 | 12/1999 |
| WO | 01/22285 | 3/2001 |
| WO | 01/29780 | 4/2001 |

OTHER PUBLICATIONS

Marchware Technologies Inc., AUTOSTAN, Generalized Standardization System, User's Manual Version 4.6, Feb. 11, 1998, pp. 1-90.

Vality Technology Incorporate, INTEGRITY, Data Re-engineering Environment, SUPERSTAN User Guide Version 2.5, Mar. 1998.

Written Opinion for International Application No. PCT/US02/41630 dated Jan. 19, 2005.

Written Opinion for International Application No. PCT/US04/09035 dated Nov. 4, 2004.

International Search Report from PCT/US03/35607 dated Apr. 24, 2004.

International Search Report for PCT/US04/03465 dated Apr. 7, 2005.

International Search Report for PCT/US03/41662 dated May 28, 2004.

International Search Report for PCT/US04/09035 dated Nov. 4, 2004.

Amba et al., *Automatic Linking of Thesauri*, Proc. 18th Annual Intl. ACM SIGIR Conf. on R&D in Information Retrieval, Jul. 9-13, 1995, pp. 181-188.

Batory et al., *Implementation Concepts for an Extensible Data Model and Data Language*, acm Transactions on Database Systems, Sep. 1988, vol. 13, No. 3, pp. 231-262.

Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).

Boruch et al., "Exact Matching of Micro Data Sets in Social Research: Benefits and Problems", Record Linkage Techniques—1985; Proceedings of the Workshop on Exact Matching Methodologies. Arlington, VA, pp. 145-153 (May 9-10, 1985).

Callan et al., *Searching Distributed Collections With Inference Networks*, Proc. 18th Annual Intl. ACM SIGIR Conf. on R&D in Information Retrieval, Jul. 9-13, 1995, pp. 21-28.

Childers et al., *The IRS/Census Direct Match Study—Final Report*, Bureau of the Census—Statistical Research Division Report Series, Aug. 1, 1984, pp. 1-22.

Crane et al., "Project LINK-LINK: An-Interactive Database of Administrative Record Linkage Studies", National Center for Education Statistics and U.S. Department of Agriculture, Record Linkage Techniques—1985: Proceedings of the Workshop on Exact Matching Methodologies, Arlington, VA, pp. 311-315 (May 9-10, 1985).

DeFazio et al., *Integrating IR and RDMBS Using Cooperative Indexing*, Proc. 18th Annual Intl. ACM SIGIR Conf. on R&D in Information Retrieval, Jul. 9-13, 1995, pp. 84-92.

(56) References Cited

OTHER PUBLICATIONS

DeWitt et al., *An Evaluation of Non-Equijoin Algorithms*, Proc. 17th Intl. Conf. on Very Large Data Bases, Sep. 1991, pp. 443-452.
Findler, *Information Retrieval Systems*, An Artificial Intelligence Technique for Information and Fact Retrieval, 1991.
Gelbart et al., *Toward a Comprehensive Legal Information Retrieval System*, Database and Expert Systems Applns., Proc. Intl. Conf. in Vienna, Austria, 1990, pp. 121-125.
Hernandez, *A Generalization of Band Joins and the Merge/Purge Problem*, IEEE Trans. on Knowledge and Data Engineering, 1996.
Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).
Hou et al., *Medical Image Retrieval by Spatial Features*, 1992 IEEE Intl. Conf. on Systems, Man and Cybernetics, Oct. 1992, vol. 1, pp. 1364-1369.
Howe et al.; "A Generalized Iterative Record Linkage Computer System for Use in Medical Follow-up Studies", Computers and Biomedical Research 14, pp. 327, 240 (1981).
International Search Report from PCT/US03/35607, dated Apr. 24, 2004.
Jaro, "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).
Jaro, "Record Linkage Research and the Calibration of Record Linkage Algorithms", U.S. Bureau of the Census, Report No. rr-84/27 (Aug. 9, 1984).
Kimoto et al., *Construction of a Dynamic Thesaurus and its Use for Associated Information Retrieval*, Proc. 13th Intl. Conf. on R&D in Information Retrieval, Sep. 5-7, 1990, pp. 227-241.
Knoblock, *Searching the World Wide Web*, Trends & Controversies, Jan.-Feb. 1997, pp. 8-24.
Labio et al., *The WHIPS Prototype for Data Warehouse Creation and Maintenance*, 1997, pp. 557-559.
LaPlant Jr., *Generalized Data Standardization Program Generator (GENSTAN) Program Generation System Part II*, Bureau of the Census Statistical Research Division Report Series, Jul. 22, 1986.
LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.
Lee, Joon Ho, "Combining Multiple Evidence from Different Properties of Weighting Schemes", Proceedings of the 18th Annual International ACM SIGIR Conference on Research and Development in Information Retrieval, Seattle, Washington, USA (Jul. 9-Jul. 13, 1995) pp. 180-188.
Lu et al., *Pipelined Band Join in Shared-Nothing Systems*, Proc. 1995 Asian Computing Science Conf., Dec. 1995, pp. 239-253.
Romberg, *Meta-Entities Keeping Pace with Change*, Database Programming & Design, Jan. 1995, pp. 54-59.
Scheuren, "Methodologic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).
Sclaroff et al., *ImageRover: A Content-Based Image Browser for the World Wide Web*, IEEE Workshop on Content-Based Access of Image and Video Libraries, Jun. 1997, pp. 2-9.
Smith, "Record-Keeping and Data Preparation Practices to Facilitate Record Linkage", Statistics Canada Record Linkage Techniques—1985: Proceedings of the Workshop on Exact Matching Methodologies, Arlington, VA, pp. 321-326 (May 9-10, 1985).
Suardi et al., *Execution of Extended Multidatabase SQL*, 1993, pp. 641-650.
Verykios et al., *A Bayesian decision model for cost optimal record matching*, The VLDB Journal, 2000, vol. 12, Nos. 28-450, pp. 28-40.

Winkler et al., *An Application of the Fellegi-Sunter Model of Record Linkage to the 1990 U.S. Decennial Census*.
Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).
Yearwood et al., *Retrieving cases for treatment advice in nursing using text representation and structured text retrieval*, Artificial Intelligence in Medicine, Jan. 1997, vol. 9, No. 1, pp. 79-98.
Yuwono et al., *Search and Ranking Algorithms for Locating Resources on the World Wide Web*, Intl. Conf. on Data Engineering, 1996, pp. 164-171.
Japanese Office Action dated Jul. 8, 2008, Patent Application No. 2003-558673 (with English translation).
Japanese Office Action dated Dec. 16, 2008, Patent Application No. 2003-558673 (with English translation).
Hoshino, "Inter-database relationships discovery and retrieval method for multidatabase environment," Jul. 10, 1998, vol. 98, No. 58, pp. 389-396 (with English Abstract).
Suzuki et al., "Fragment view-heterogeneity resolution method in multi-database without global view," The Institute of Electronics Information and Communication Engineers, Tech Report of IICE, pp. 25-30 (with English Abstract).
Munakata, "Integration of heterogenous information sources," Institute of Systems Control and Information Engineers, Dec. 15, 1996, vol. 40, No. 12, pp. 14-21 (with English Abstract).
Takezaki et al., "A method of database linkage between telephone directory and residential map," NTT Electrical Communication Lab, National Convention Record, Mar. 26-29, 1987 p. 1-111 (with English Abstract). (No. 1).
Takezaki et al., "A method of database linkage between telephone directory and residential map," NTT Electrical Communication Lab, National Convention Record, Mar. 26-29, 1987 No. 1, p. 6-91 (with English Abstract). (No. 2).
Supplemental European Search Report, Application No. EP 02806260, dated Mar. 23, 2009.
Rahm et al., "Data Cleaning: Problems and Current Approaches" Quarterly Bulletin of the Computer Science of the IEEE Technical Committee on Data Engineering, Dec. 1, 2000, pp. 1-11.
Garcia et al., "Immunization Registries DeDuplication and Record Matching," White Paper, Internet citation, 1999, www.immunizationregistries.com/white_papers/WHP006A_deduplication_recordmatching.pdf, pp. 1-11.
Whalen et al., "Linking Client Records from Substance Abuse, Mental Health and Medicaid State Agencies," Internet citation, Jul. 2001, www.samhsa.gov/centers/csat/content/idbse/linking.pdf, pp. 9-13.
Sattler et al., "A Data Preparation Framework Based on a Multidatabase Language," Database Engineering & Applications, 2001, International Symposium on Jul. 16-18, 2001, pp. 219-228.
Anonymous, "Oracle Warehouse Builder: A Technical Overview," Oracle Technical White Paper, Jan. 1, 2000, pp. 1-21.
English translation of Japanese Office Action dated Apr. 14, 2009.
Japanese Office Action dated Sep. 24, 2009 with English translation of Notice of Reasons for Rejection.
European Summons to Attend to Oral Proceedings dated Sep. 27, 2011 for EP application No. 02806260.2.
Tatsuo Tsuji, "Basic Knowledge for Database System". Open Design, vol. 7, No. 2, Apr. 1, 2000, pp. 58-81.
English translation of Japanese Office Action dated May 10, 2011 for JP application No. 2003-558673, which translates portions of the Office Action that applies, discusses, or otherwise mention the Tatsuo Tsuji reference identified above.
European Communication dated Jun. 24, 2009 for EP application No. 02806260.2.
Canadian Office Action dated Oct. 7, 2010 for CA application No. 2,471,940.
CA Office Action dated May 23, 2013 for CA application No. 2,471,940.

\* cited by examiner

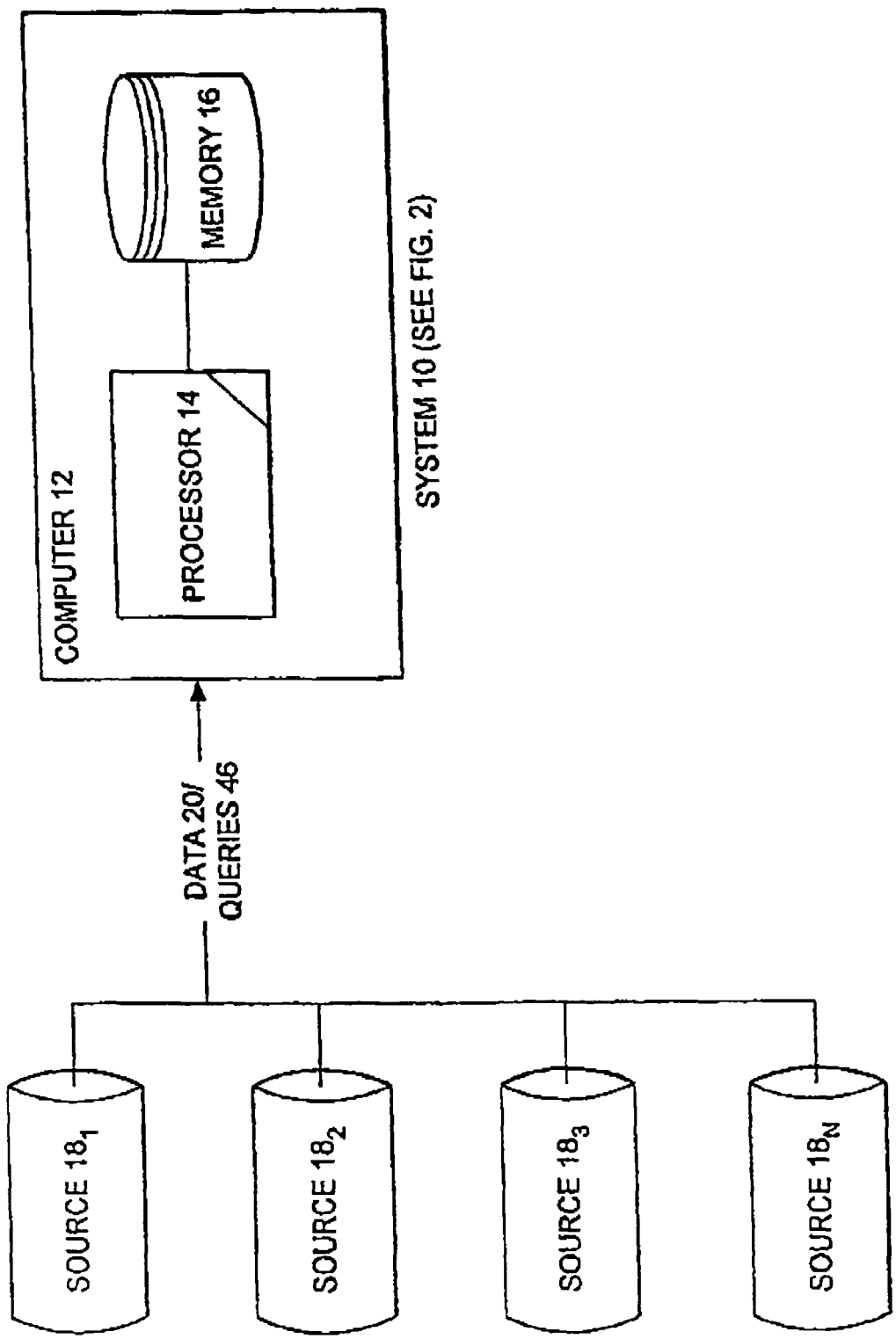

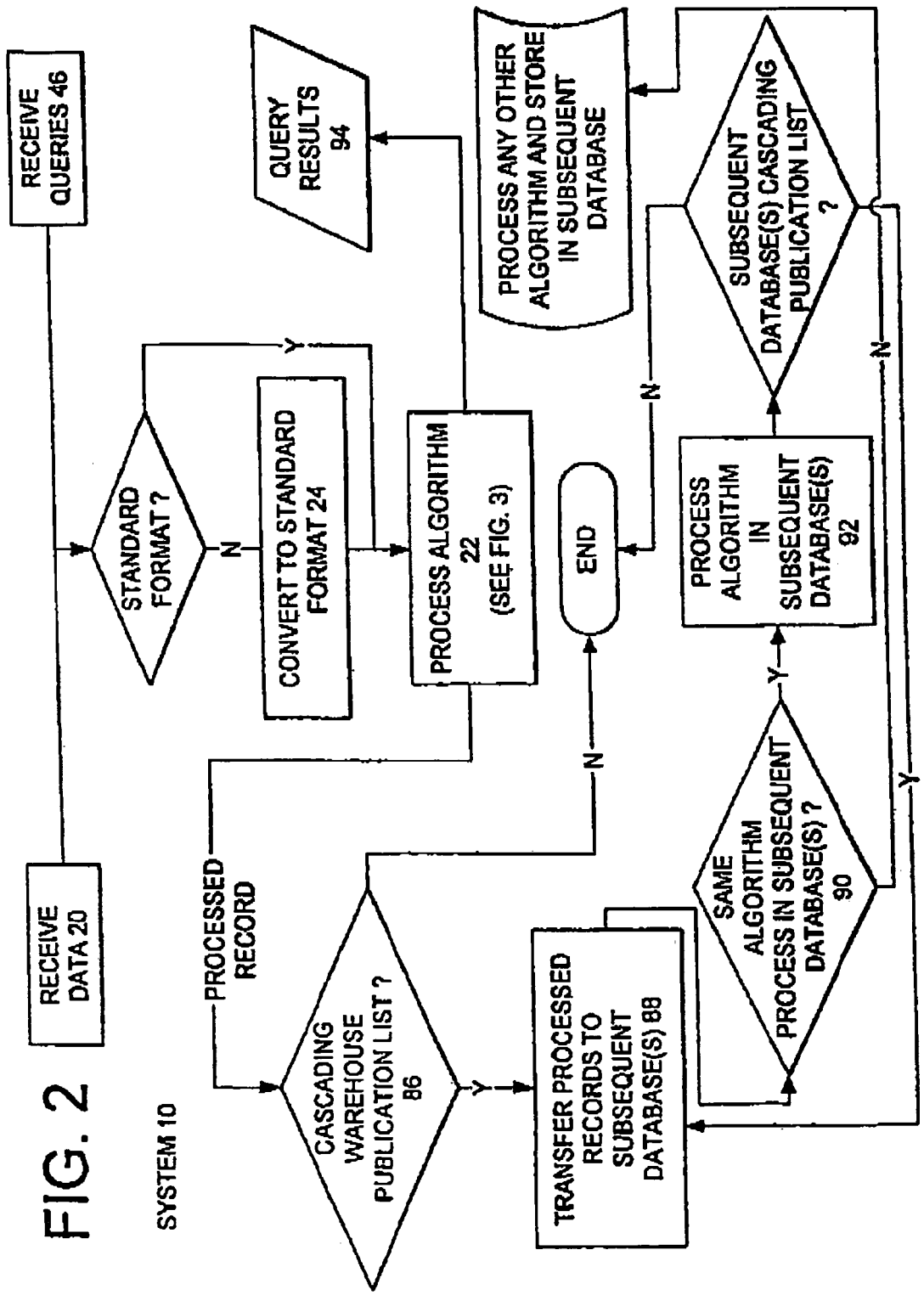

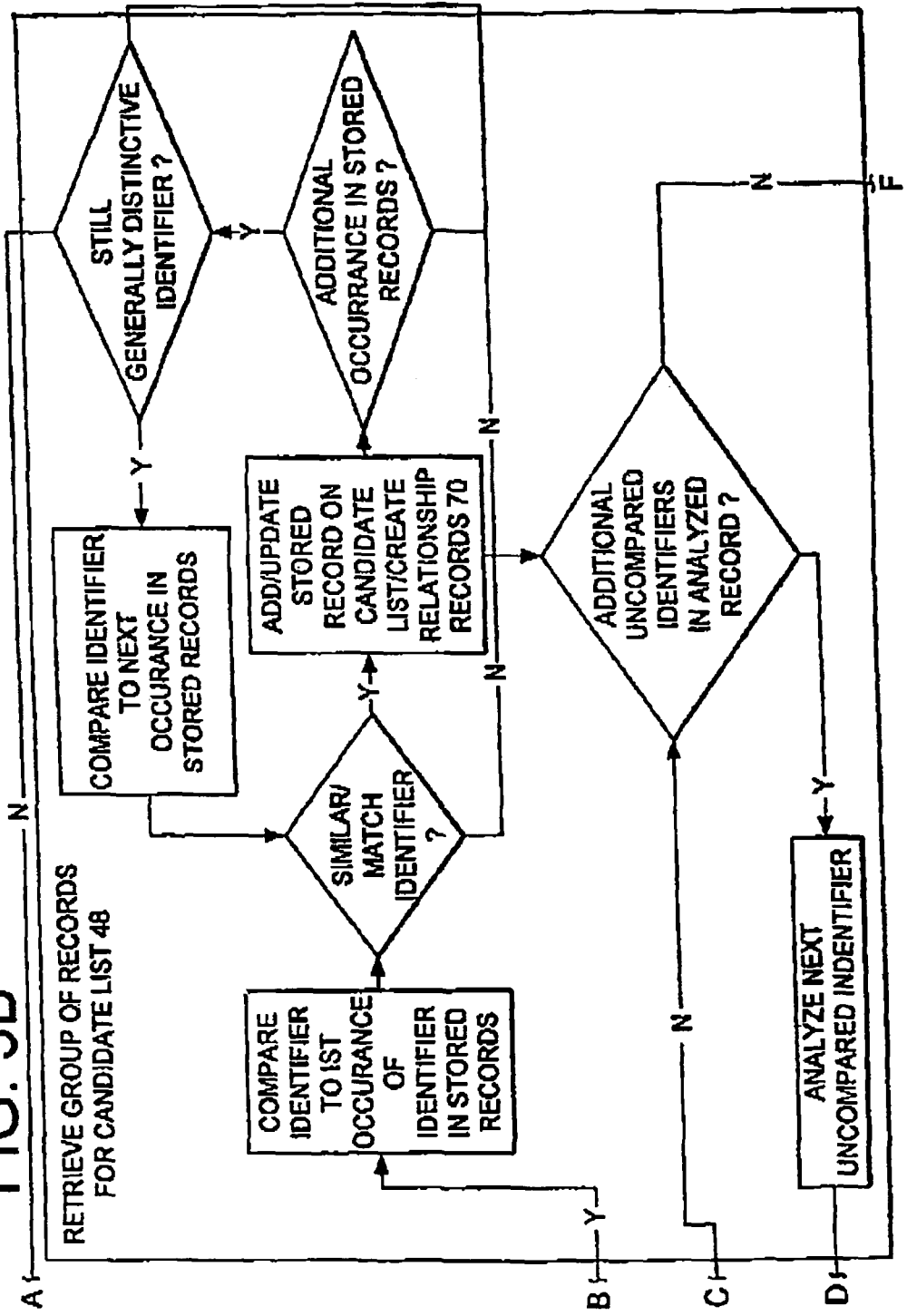
FIG. 3B  PROCESS ALGORITHM 22

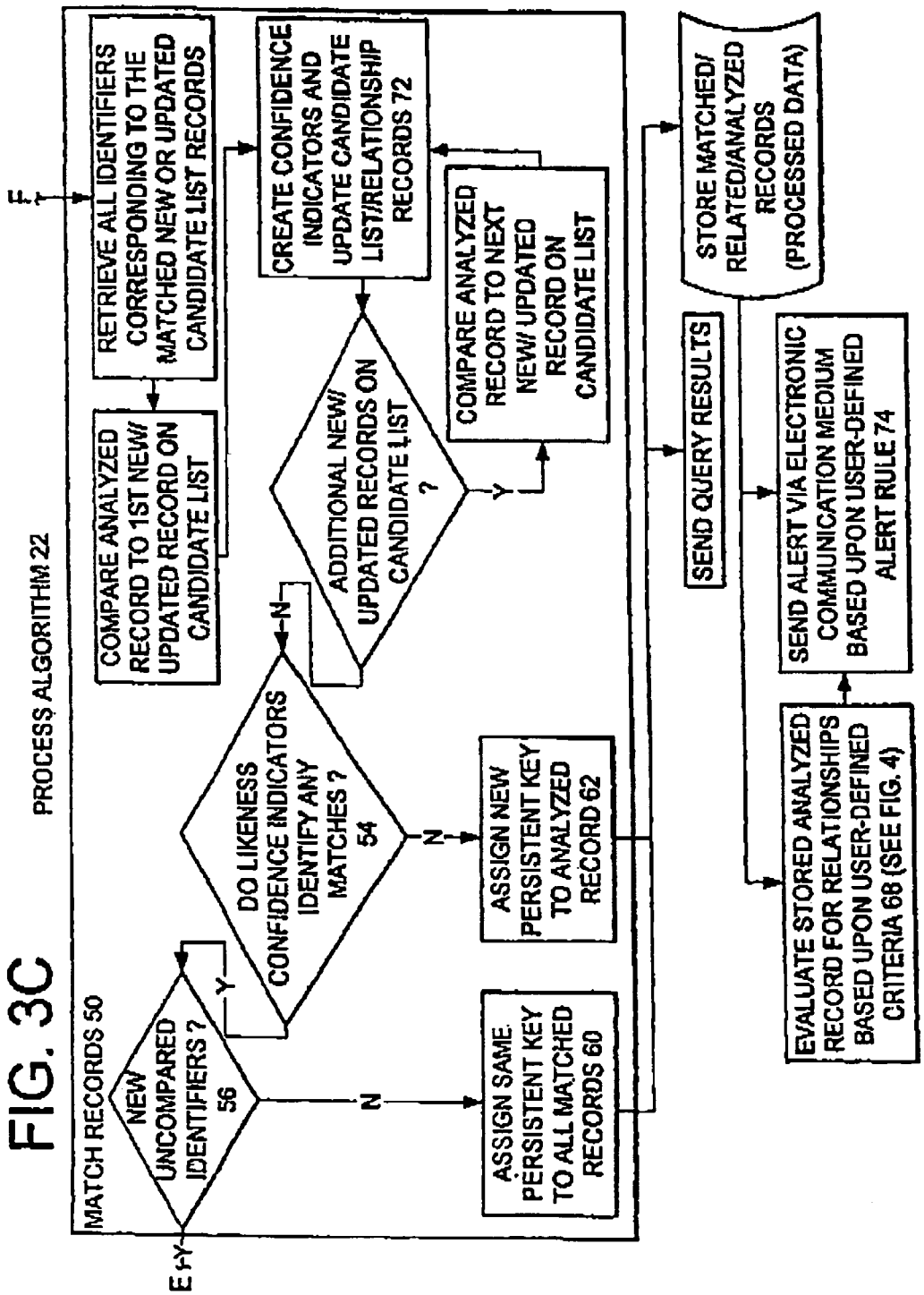

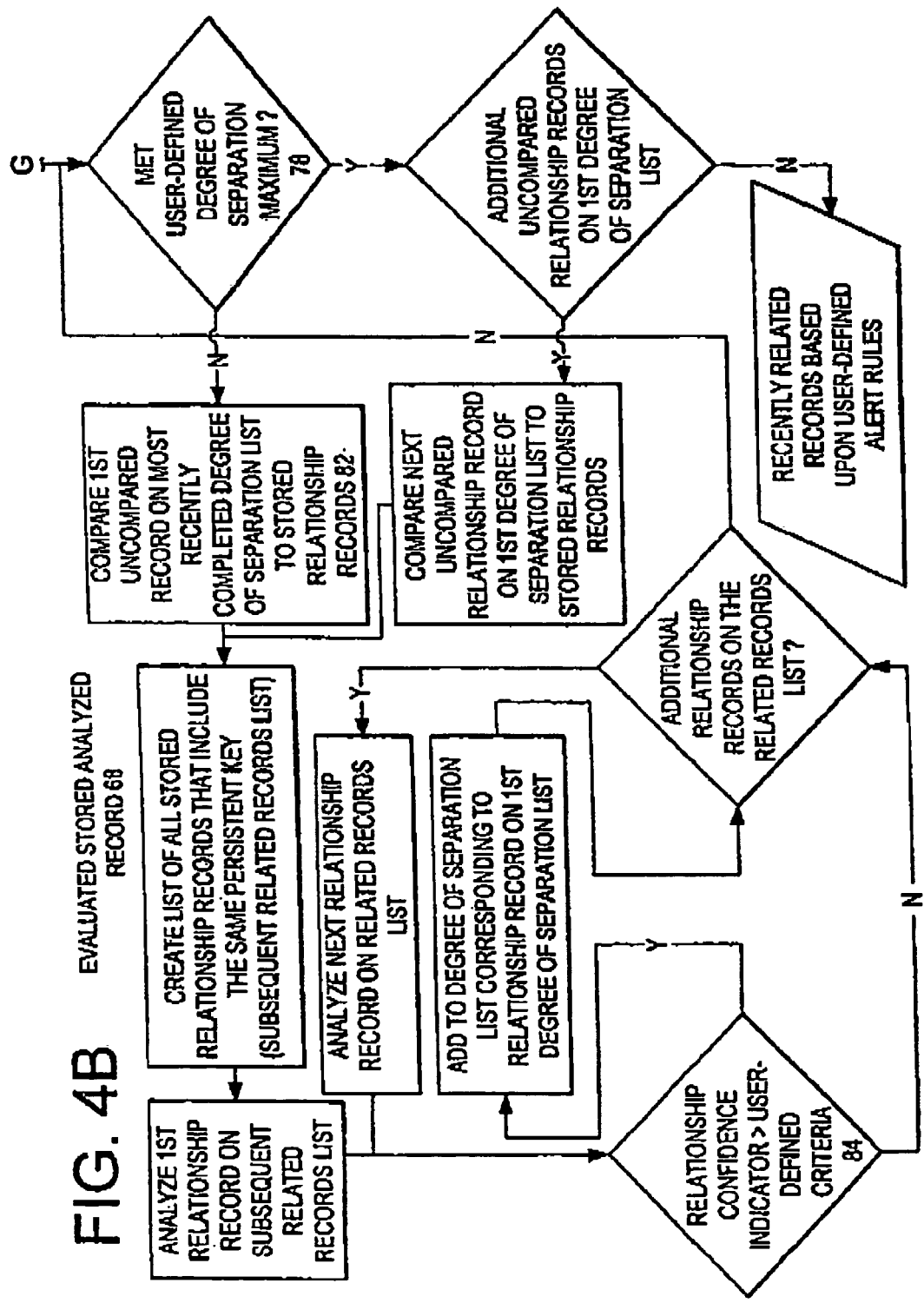

REAL TIME DATA WAREHOUSING

CROSS REFERENCE TO RELATED APPLICATIONS

This application is a Divisional of application Ser. No. 10/331,068, filed Dec. 27, 2002, now U.S. Pat. No. 8,452,787, entitled REALTIME DATA WAREHOUSING, which application is incorporated herein by reference.

FEDERALLY SPONSORED OR DEVELOPMENT

Not Applicable.

TECHNICAL FIELD

This invention generally relates to a method, program and system for processing and retrieving data in a data warehouse and, more particularly, to a method, program and system for the processing of data into and in a data warehouse, to the querying of data in a data warehouse, and the analyzing of data in a data warehouse.

BACKGROUND OF THE INVENTION

Data warehouses are computer-based databases designed to store records and respond to queries generally from multiple sources. The records correspond with entities, such as individuals, organizations and property. Each record contains identifiers of the entity, such as for example, a name, address or account information for an individual.

Unfortunately, the effectiveness of current data warehouse systems is diminished because of certain limitations that create, perpetuate and/or increase certain data quality, integrity and performance issues. Such limitations also increase the risk, cost and time required to implement, correct and maintain such systems.

The issues and limitations include, without limitation, the following: (a) challenges associated with differing or conflicting formats emanating from the various sources of data, (b) incomplete data based upon missing information upon receipt, (c) multiple records entered that reflect the same entity based upon (often minor) discrepancies or misspellings, (d) insufficient capability to identify whether multiple records are reflecting the same entity and/or whether there is some relationship between multiple records, (e) lost data when two records determined to reflect the same entity are merged or one record is discarded, (f) insufficient capability to later separate records when merged records are later determined to reflect two separate entities, (g) insufficient capability to issue alerts based upon user-defined alert rules in real-time, (h) inadequate results from queries that utilize different algorithms or conversion processes than the algorithms or conversion processes used to process received data, and (i) inability to maintain a persistent query in accordance with a pre-determined criteria, such as for a certain period of time.

For example, when the identifiers of an individual are received and stored in a database: (a) the records from one source may be available in a comma delimited format while the records of another source may be received in another data format; (b) data from various records may be missing, such as a telephone number, an address or some other identifying information; or (c) two records reflecting the same individual may be unknowingly received because one record corresponds to a current name and another record corresponds to a maiden name. In the latter situation, the system may determine that the two records ought to be merged or that one record (perhaps emanating from a less reliable source) be discarded. However, in the merging process, current systems typically abandon data, which negates the ability to later separate the two records if the records are determined to reflect two separate entities.

Additionally, when the identifiers are received and stored in a database, the computer may perform transformation and enhancement processes prior to loading the data into the database. However, the query tools of current systems use few, if any, of the transformation and enhancement processes used to receive and process the received data, causing any results of such queries to be inconsistent, and therefore inadequate, insufficient and potentially false.

Similarly, current data warehousing systems do not have the necessary tools to fully identify the relationship between entities, or determine whether or not such entities reflect the same entity in real-time. For example, one individual may have the same address of a second individual and the second individual may have the same telephone number of a third individual. In such circumstances, it would be beneficial to determine the likelihood that the first individual had some relationship with the third individual, especially in real-time.

Furthermore current data warehousing systems have limited ability to identify inappropriate or conflicting relations between entities and provide alerts in real-time based upon user-defined alert rules. Such limited ability is based upon several factors, including, without limitation, the inability to efficiently identify relationships as indicated above.

Furthermore, current data warehousing systems cannot first transform and enhance a record and then maintain a persistent query over a predetermined period. A persistent query would be beneficial in various circumstances, including, without limitation, in cases where the name of a person is identified in a criminal investigation. A query to identify any matches corresponding with the person may initially turn up with no results and the queried data in current systems is essentially discarded. However, it would be beneficial to load the query in the same way as received data wherein the queried data may be used to match against other received data or queries and provide a better basis for results.

As such, any or all the issues and limitations (whether identified herein or not) of current data warehouse systems diminishes accuracy, reliability and timeliness of the data warehouse and dramatically impedes performance. Indeed, the utilization with such issues may cause inadequate results and incorrect decisions based upon such results.

The present invention is provided to address these and other issues.

SUMMARY OF THE INVENTION

It is an object of the invention to provide a method, program and system for processing data into and in a database. The method preferably comprises the steps of: (a) receiving data for a plurality of entities, (b) utilizing an algorithm to process the received data, (c) storing the processed data in the database, (d) receiving data queries for retrieving data stored in the database, and (e) utilizing the same algorithms to process the queries.

The data comprises one or more records having one or more identifiers representing one or more entities. The entities may be individuals, property, organizations, proteins or other things that can be represented by identifying data.

The algorithm includes receiving data that has been converted to a standardized message format and retains attribution of the identifiers, such as a source system, the source system's unique value for the identifier, query system and/or user.

The algorithm process includes analyzing the data prior to storage or query in the database wherein such analyzing step may include: (a) comparing one or more identifiers against a user-defined criterion or one or more data sets in a database, list, or other electronic format, (b) formatting the identifier in accordance with the user-defined standard, (c) enhancing the data prior to storage or query by querying one or more data sets in other databases (which may have the same algorithm as the first database and continue to search in a cascading manner) or lists for additional identifiers to supplement the received data with any additional identifiers, (d) creating hash keys for the identifiers, and (d) storing processed queries based upon user-defined criterion, such as a specified period of time.

It is further contemplated that the method, program and system would include: (a) utilizing an algorithm to process data and match records wherein the algorithm process would: (i) retrieve from the database a group of records including identifiers similar to the identifiers in the received data, (ii) analyze the retrieved group of records for a match to the received data, (iii) match the received data with the retrieved records that are determined to reflect the same entity, (iv) analyze whether any new identifiers were added to any matched record, and (v) re-search the other records of the retrieved group of records to match to any matched record, and (b) storing the matched records in the database. Additionally, the algorithm may include: (a) retrieving from the database an additional group of records including identifiers similar to the identifiers in the matched record, (b) repeating the steps of retrieving records, analyzing for matches, matching same entity records, analyzing new identifiers, and re-searching retrieved records until no additional matches are found, and (c) assigning a persistent key to the records. Such processes could be performed in batch or in real-time.

It is yet further contemplated that the method, program and system includes determining whether a particular identifier is common across entities or generally distinctive to an entity, and separating previously matched records if the particular identifier used to match the records is later determined to be common across entities and not generally distinctive of an entity. Such determining and separating steps may be performed in real-time or in batch. The determining and separating steps may include stopping any additional matches based upon an identifier that is determined to be common across entities and not generally distinctive of an entity, as well as re-processing any separated records.

It is further contemplated that the received data is compared with at least one other previously stored record to determine the existence of a relationship between the entities, and that a relationship record is created for every two entities for which there exists a relationship. The relationship record may include confidence indicator(s), indicating the likelihood of a relationship between the two entities or the likelihood that the two entities are the same. The relationship record may also reference roles of the entities that are included in the received data or assigned. The relationship records are analyzed to determine the existence of any previously unknown related records based upon the existence of a user-defined criterion. The relationship records reflect a first degree of separation which may be analyzed and navigated to include only those records that meet a predetermined criterion, such as a maximum number of degrees of separation test or a minimum level of the relationship and/or likeness confidence indicators. An alert may be issued identifying the group of related records based upon a user-defined alert rule. The alert may be communicated through various electronic communication means, such as an electronic mail message, a telephone call, a personal digital assistant, or a beeper message.

It is further contemplated that the method would include: (a) duplicating the relationship records on one or more databases, (b) distributing received data to one or more of the additional databases for analysis based upon work load criteria; and (c) issuing any alerts from the additional databases.

It is further contemplated that the method and system would include transferring the stored data to another database that uses the same algorithm as the first database. The steps of processing and transferring may be performed in real-time or in batch.

These and other aspects and attributes of the present invention will be discussed with reference to the following drawings and accompanying specification.

BRIEF DESCRIPTION OF THE DRAWINGS

FIG. 1 is a block diagram of a system in accordance with the present invention;

FIG. 2 is a flow chart for process data in the System block in FIG. 1;

FIGS. 3A, 3B and 3C together are a flow chart of the Process Algorithm block in FIG. 2; and FIGS. 4A and 4B together are a flow chart of the Evaluate Stored Analyzed Record block in FIGS. 3A 3B and 3C.

DETAILED DESCRIPTION OF THE INVENTION

Figure 3A:
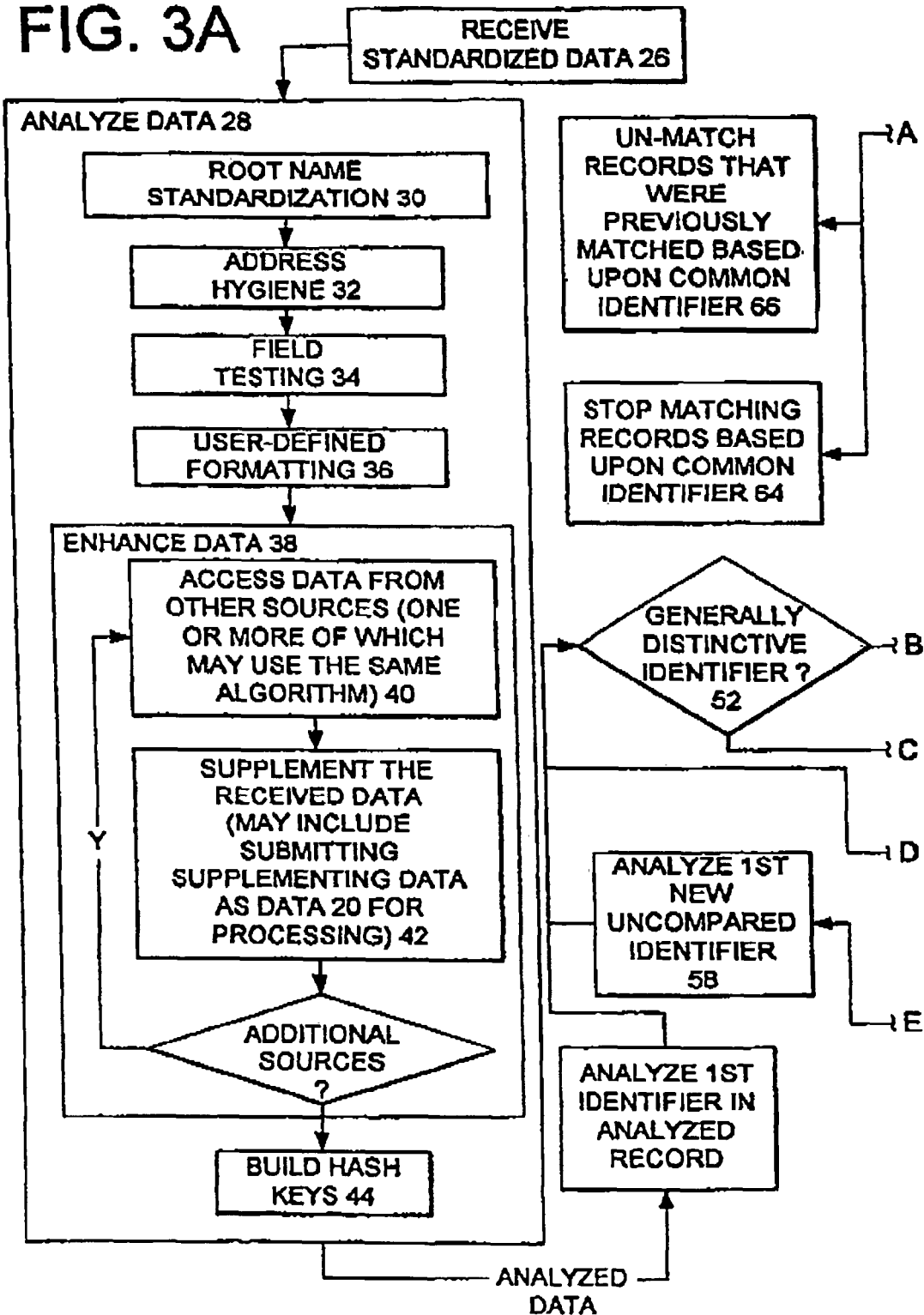

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A data processing system 10 for processing data into and in a database and for retrieving the processed data is illustrated in FIGS. 1, 2, 3A, 3B, 3C, 4A and 4B. The system 10 includes at least one conventional computer 12 having a processor 14 and memory 16. The memory 16 is used for storage of the executable software to operate the system 10 as well as for storage of the data in a database and random access memory. However, the software can be stored or provided on any other computer readable medium, such as a CD, DVD or floppy disc. The computer 12 may receive inputs from a plurality of sources $18_1$-$18_n$.

The data comprises one or more records having one or more identifiers representing one or more entities. The entities may be individuals, organizations, property, proteins, chemical or organic compounds, biometric or atomic structures, or other things that can be represented by identifying data. The identifiers for an individual type entity may include the individual's name, address(es), telephone number(s), credit card number(s), social security number, employment information, frequent flyer or other loyalty program, or account information. Generally distinctive identifiers are those that are distinctive to a specific entity, such as a social security number for an individual entity.

As illustrated in FIG. 2, the system 10 receives the data from the plurality of sources $18_1$-$18_n$ and utilizes an algorithm 22 to process the received data 20. The algorithm is stored in the memory 16 and is processed or implemented by the processor 14.

The received data 20 including, without limitation, attributions of the received data (e.g., source system identification), is likely received in many data formats. Prior to being processed by the algorithm 22, the received data 20 is converted into a standardized message format 24, such as Universal Message Format.

Thereafter, as illustrated in FIGS. 3A, 3B and 3C, the algorithm 22 receives the standardized data 26 and analyzes 28 the received data 26 prior to storage or query in the database by (a) comparing the received data 26 to user-defined criteria or rules to perform several functions, including, without limitation, the following (i) name standardization 30 (e.g., comparing to a root names list), (ii) address hygiene 32 (e.g., comparing to postal delivery codes), (iii) field testing or transformations 34 (e.g., comparing the gender field to confirm M/F or transforming Male to M, etc.), (iv) user-defined formatting 36 (e.g., formatting all social security numbers in a 999-99-9999 format), (b) enhancing the data 38 by causing the system 10 to access one or more databases 40 (which may contain the same algorithm as the first database, thus causing the system to access additional databases in a cascading manner) to search for additional information (which may be submitted as received data 20) which can supplement 42 the received data 26, and (c) building hash keys of the analyzed data 44. Any new, modified or enhanced data can be stored in newly created fields to maintain the integrity of the original data. For example, if the name "Bobby Smith" is received in a standardized format 26, the name "Bobby" may be compared to a root name list 30, standardized to the name "Robert" and saved in a newly created field for the standard name. Additionally, if the name and address for Bobby Smith is received 26, the system 10 can access a conventional Internet-based people finder database 40 to obtain Bobby Smith's telephone number, which can then be formatted in a standard way based upon user-defined criteria 36. Furthermore, the address field may be compared to an address list 32, resulting in the text "Street" added to the end of the standardized address. Hash keys are then built 44 based upon the enhanced data and stored in newly created fields.

Referring again to FIG. 2 the system 10 also receives queries 46 from the plurality of sources 18$_1$-18$_n$ and utilizes the same algorithm 22 to analyze and process the received queries 46. For example, if a query for "Bobby Smith" is received 46, the same algorithm 22 which standardized the received name "Bobby" to the name "Robert" will also standardize the queried name "Bobby" to the queried name "Robert." Indeed, the system 10 loads and stores received queries 46 the same as received data 20, maintaining the full attribution of the query system and user. As such, as the system 10 processes the received queries 46, the algorithm 22 may search other databases 40, such as a public records database, to find missing information. Query results 94 may be broader than exact matches, and may include relationship matches. For example, if the query is for "Bobby Smith", the query results 94 may include records of people who have used Bobby Smith's credit card, or have lived at Bobby Smith's address.

Referring again to FIGS. 3A, 3B and 3C, the algorithm 22 also performs a function upon receipt of any received data 26 to: (a) determine whether there is an existing record in the database that matches the entity corresponding to such received data and (b) if so, matching the received data to the existing record. For example, the algorithm retrieves a group of records 48 (including identifiers similar to the identifiers in the received data) from the database for possible candidates and analyzes the retrieved group of records for a match 50 identifying an existing stored record corresponding to the received data based upon generally distinctive identifiers 52. If a match is identified 54, the algorithm analyzes whether the matched record contains any new or previously unknown identifiers 56. If there were new or previously unknown identifiers 56, the algorithm 22 would analyze the new or previously unknown identifiers 58, add or update the candidate list/relationship records 70 based upon the new or previously unknown identifiers in the matched record, and determine whether any additional matches 50 exist. This process is repeated until no further matches can be discerned. The matching process would then assign all of the matched records the same persistent key 60. Furthermore, if no matches were found for any record, the unmatched record would be assigned its own persistent key 62. The records retain full attribution of the data and the matching process does not lose any data through a merge, purge or delete function.

For example, if record #1 has an individual's name, telephone number and address, and record #2 has the same name and a credit card number. One does not know whether or not they are the same individual, so the records must be kept separate. Then data for record #3 is received, including the individual's name (same as record #1), address (same as record #1), telephone number (same as record #1) and credit card number. Because the name, telephone number and address for #1 and #3 match, the system 10 may determine that #1 and #3 are describing the same individual, so the algorithm matches record #1 with #3 data. The system 10 then re-runs the algorithm, comparing the matched record #1 with the other records of the candidate list or additional records that include identifiers similar to the matched record. Because the name and credit card number of matched record #1 matches the name and credit card number of record #2, these two records are also matched. This matched record is then run again against the candidate list or additional records retrieved looking for matches 54 until no more matches are obtained.

On occasion, the system 10 may determine that two records were incorrectly matched. For example, social security numbers are considered generally distinctive identifiers for individuals, and thus records often are matched based upon the same social security number. However, it is possible that such number, in certain circumstances, is later determined to be common across entities and not generally distinctive of an entity. For example, consider a data entry operation having a record field for social security numbers as a required field, but the data entry operator who did not know the social security number of the individuals merely entered the number "123-45-6789" for each individual.

In such a case, the social security number would be common across such individual type entities and no longer a generally distinctive identifier for these individuals. Accordingly: (a) the now known common identifier would be added to a list of common identifiers and all future processes would not attempt to retrieve records for the candidate list or create relationship records 70 based upon the now known common identifier, thus stopping any future matches 64 and (b) any records that were matched based upon that erroneous social security number would need to be split to reflect the data prior to the match, thus requiring no prior data loss. To accomplish the latter objective, the system 10 separates any matches that occurred based upon the incorrect assumptions 66 to the point prior to the incorrect assumption pursuant to the full attribution of the data, without any loss of data. Thus, if record #1 for "Bobby Smith" (which had been standardized to "Robert Smith") had been matched with record #2 for "Robert Smith", and it is later determined that these are two different individuals, and that they needed to be broken into the original record

's 1 and 2, the algorithm would identify that the standardized "Robert Smith" of record #1 was known as "Bobby." Furthermore, the determining and separating steps can be performed in real-time or in batch. Furthermore, the separated records may be re-submitted as new received data to be processed in the system.

Figure 4A:
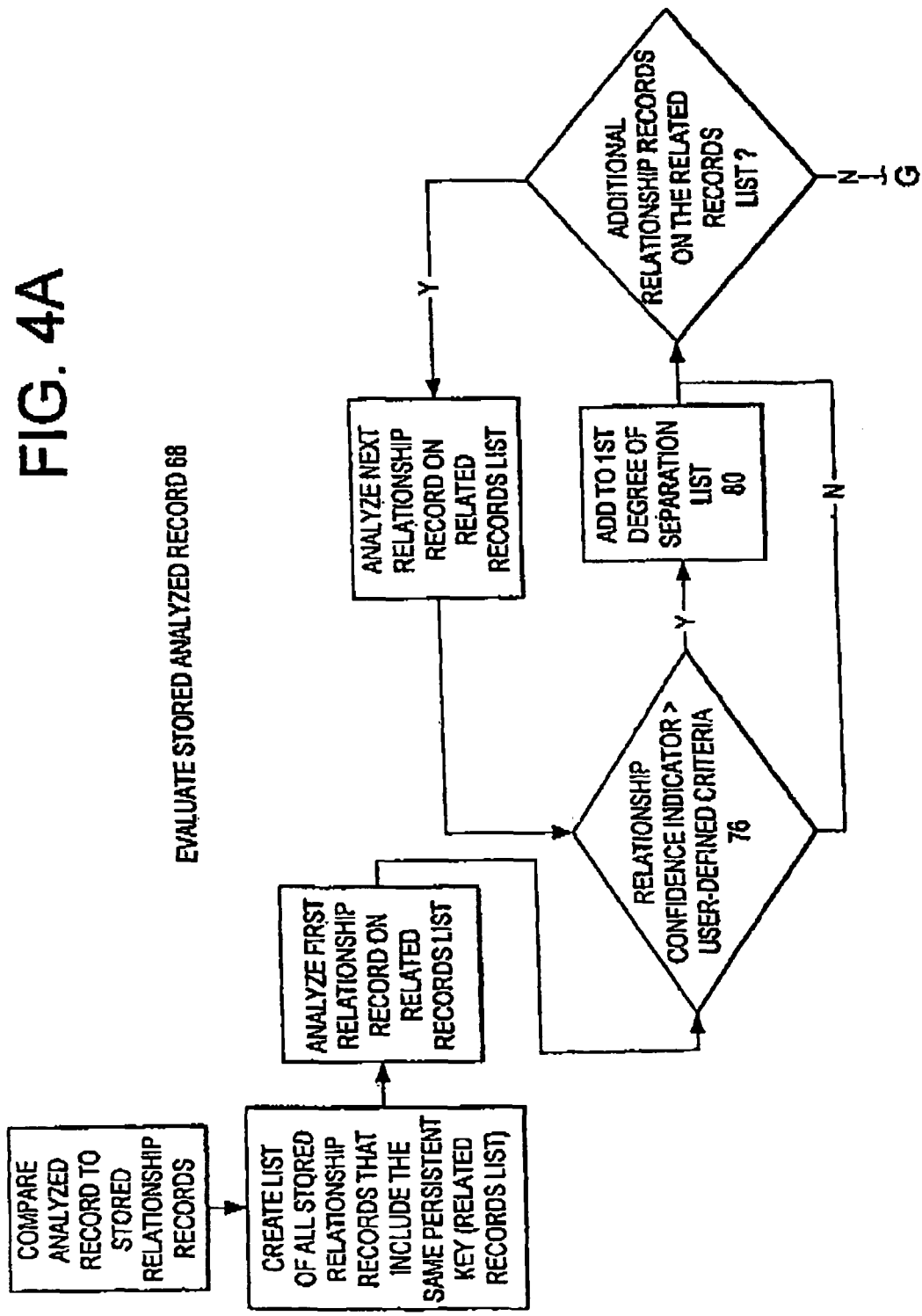

There are also times when relationships, even less than obvious relationships, need to be evaluated at 68, which is further described in FIGS. 4A and 4B. For example, individuals #1 and #2 may each have a relationship to an organization #3. Thus it is possible, perhaps likely, that there is a relationship between individuals #1 and #2. The relationships can be extended to several degrees of separation. Accordingly, the system 10 compares all received data to all records in the stored data and creates a relationship record 70 for every pair of records for which there is some relationship between the respective entities. The relationship record 70 would include relationship types (e.g., father, co-conspirator), the confidence indicators (which are scores indicating the strength of relationship of the two entities) 72 and the assigned persistent key 60 or 62. For example, the confidence indicators 72 may include a relationship score and a likeness score. The relationship score is an indicator, such as between 1 and 10, representing the likelihood that there is a relationship between individual #1 and individual #2. The likeness score is also an indicator, such as between 1 and 10, that individual #1 is the same person as individual #2. The confidence indicators 72 could be identified during the marching process described hereinabove.

The system 10 also analyzes the received data 20 and queries 46 to determine the existence of a condition that meets the criteria of a user-defined alert rule 74, such as an inappropriate relationship between two entities or a certain pattern of activities based upon relationship records that have a confidence indicator greater than a predetermined value and/or have a relationship record less than a predetermined number of degrees of separation. For example, the system 10 may include a list of fraudulent credit cards that could be used to determine whether any received data or query contains a credit card number that is on the list of fraudulent credit card numbers. Additionally, the user-defined alert rule 74 may cause the received data and queries to be reported. For example, an alert rule may exist if, upon entering data of a new vendor, it was determined that the new vendor had the same address as a current employee, indicating a relationship between the vendor and the employee that perhaps the employer would like to investigate. Upon determination of a situation that would trigger the user-defined alert rule, the system 10 issues an alert 74 which may be communicated through various mediums, such as a message via an e-mail or to a hand-held communication device, such as an alpha-numeric beeper, personal digital assistant or a telephone.

For example, referring to FIGS. 4A and 4B, based upon a user-defined alert rule for all records that have a likelihood of relationship confidence indicator greater than seven 76 to a maximum of six degrees of separation 78, the system 10 will: (a) start with individual #1, (b) find all other individuals 80 related to #1 having a confidence indicator greater than seven 76, (c) analyze all of the first degree of separation individuals 80, and determine all individuals 82 related to the first degree of separation individuals 80 having a confidence indicator greater than seven 84 and (d) repeat the process until it meets the six degrees of separation parameter 78. The system would send electronically an alert 74 (that may include all the resulting records based upon a user-defined criterion) to the relevant individual or separate system enabling further action.

Furthermore, referring again to FIGS. 3A, 3B and 3C, the relationship records 70 could be duplicated over several databases. Upon receipt of received data 20, the system could systematically evaluate the nature of the work load of each of the other databases and distribute the matched/related/analyzed records to the database most likely to efficiently analyze the stored analyzed record 68. Any alerts 74 could then be issued from any results emanating from the other databases.

Finally, referring again to FIG. 2, the processed data can be transferred 88 to additional databases based upon a cascading warehouse publication list 86 that may utilize the same algorithm 92, either on a real-time or batch process. In this manner, the transferred data 88 can then be used to match with data (which may include different data) in the additional databases and any subsequent database to identify relationships, matches or processing of such data. For example, the matched records based upon the confidence indicators in a local database may be transferred 88 to the regional database to be compared and matched with data utilizing the same algorithm 92. Thereafter, the processed data resulting from the regional database may be transferred 88 to the national office. By combining the processed data in each step, especially in real-time, organizations or system users would be able to determine inappropriate or conflicting data prompting further action.

Conventional software code can be used to implement the functional aspects of the method, program and system described above. The code can be placed on any computer readable medium for use by a single computer or a distributed network of computers, such as the Internet.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for processing data in a database, the method comprising the steps of:
   receiving data comprising at least one record having at least one identifier, each record representing at least one of a plurality of entities;
   comparing the received data with at least one record stored in a database to determine an existence of a relationship therebetween;
   creating a relationship record for each record stored in the database determined to reflect the existence of a relationship with at least a portion of the received data, wherein the relationship record includes a relationship type and a confidence indicator for the relationship; and
   storing the relationship record in the database.

2. The method of claim 1 further comprising the step of creating at least one confidence indicator for each relationship record.

3. The method of claim 2 wherein the at least one confidence indicator indicates a likelihood of a relationship between:
   an entity represented by the record stored in the database having a relationship with the portion of the received data, and
   an entity represented by the portion of the received data.

4. The method of claim 2 wherein the at least one confidence indicator indicates a likelihood that:
   an entity represented by the record stored in the database having a relationship with the portion of the received data, and
   an entity represented by the portion of the received data are the same.

5. The method of claim 1 or 2 further comprising the step of analyzing the relationship records to determine whether the relationship records reflect at least one relationship not previously determined.

6. The method of claim 5 wherein the step of analyzing the relationship records includes analyzing relationship records reflecting at least one level of degrees of separation.

7. The method of claim 6 wherein the step of analyzing relationship records reflecting at least one level of degrees of separation includes analyzing relationship records meeting at least one user-defined criterion.

8. The method of claim 7 wherein the step of analyzing relationship records meeting at least one user-defined criterion includes limiting the relationship records analyzed to a maximum level of degrees of separation.

9. The method of claim 7 wherein the step of analyzing relationship records meeting at least one user-defined criterion includes limiting the relationship records analyzed to relationship records that include confidence indicators greater than a minimum amount.

10. The method of claim 5 further comprising the step of issuing an alert based upon at least one user-defined alert rule.

11. The method of claim 10 wherein the step of issuing an alert based upon at least one user-defined alert rule includes having the alert communicated via electronic communication means.

12. The method of claim 11 wherein the electronic communication means comprise an e-mail system.

13. The method of claim 11 wherein the electronic communication means comprise a telephone.

14. The method of claim 11 wherein the electronic communication means comprise a beeper.

15. The method of claim 11 wherein the electronic communication means comprise a personal digital assistant.

16. The method of claim 10 further comprising the step of:
duplicating the relationship records on at least one secondary database;
distributing received data to the at least one secondary database for analysis based upon work load criteria; and
issuing the alert meeting the criteria of a user-defined alert rule from the at least one secondary database.

17. A system for processing data in a database, a computer readable storage medium tangibly embodying a program of instructions execution executable by a computer for performing the method comprising the steps of:
receiving data comprising at least one record having at least one identifier, each record representing at least one of a plurality of entities;
comparing the received data with at least one record stored in a database to determine an existence of a relationship therebetween;
creating a relationship record for each record stored in the database determined to reflect the existence of a relationship with at least a portion of the received data, wherein the relationship record includes a relationship type and a confidence indicator for the relationship; and
storing the relationship record in the database.

18. The computer readable medium of claim 17 further comprising the step of creating at least one confidence indicator for each relationship record.

19. The computer readable medium of claim 18 wherein the at least one confidence indicator indicates a likelihood of a relationship between:
an entity represented by the record stored in the database having a relationship with the portion of the received data, and
an entity represented by the portion of the received data.

20. The computer readable medium of claim 18 wherein the at least one confidence indicator indicates a likelihood that:
an entity represented by the record stored in the database having a relationship with the portion of the received data, and
an entity represented by the portion of the received data are the same.

21. The computer readable medium of claim 17 or 18 further comprising the step of analyzing the relationship records to determine whether the relationship records reflect at least one relationship not previously determined.

22. The computer readable medium of claim 21 wherein the step of analyzing the relationship records includes analyzing relationship records reflecting at least one level of degrees of separation.

23. The computer readable medium of claim 22 wherein the step of analyzing relationship records reflecting at least one level of degrees of separation includes analyzing relationship records meeting at least one user-defined criterion.

24. The computer readable medium of claim 23 wherein the step of analyzing relationship records meeting at least one user-defined criterion includes limiting the relationship records analyzed to a maximum level of degrees of separation.

25. The computer readable medium of claim 23 wherein the step of analyzing relationship records meeting at least one user-defined criterion includes limiting the relationship records analyzed to relationship records that include confidence indicators greater than a minimum amount.

26. The computer readable medium of claim 21 further comprising the step of issuing an alert based upon at least one user-defined alert rule.

27. The computer readable medium of claim 26 wherein the step of issuing an alert based upon at least one user-defined alert rule includes having the alert communicated via electronic communication means.

28. The computer readable medium of claim 27 wherein the electronic communication means comprise an e-mail system.

29. The computer readable medium of claim 27 wherein the electronic communication means comprise a telephone.

30. The computer readable medium of claim 27 wherein the electronic communication means comprise a beeper.

31. The computer readable medium of claim 27 wherein the electronic communication means comprise a personal digital assistant.

32. The computer readable medium of claim 26 further comprising the step of:
duplicating the relationship records on at least one secondary database;
distributing received data to the at least one secondary database for analysis based upon work load criteria; and
issuing the alert meeting the criteria of a user-defined alert rule from the at least one secondary database.

33. The method of claim 1 wherein the confidence indicator includes a relationship score.

34. The method of claim 1 wherein the confidence indicator includes a likeness score.

35. The computer readable medium of claim 17 wherein the confidence indicator includes a relationship score.

36. The computer readable medium of claim 17 wherein the confidence indicator includes a likeness score.

* * * * *